Nov. 24, 1925.
J. J. MADIAR
ANIMAL TETHERING DEVICE
Filed July 8, 1925
1,563,212
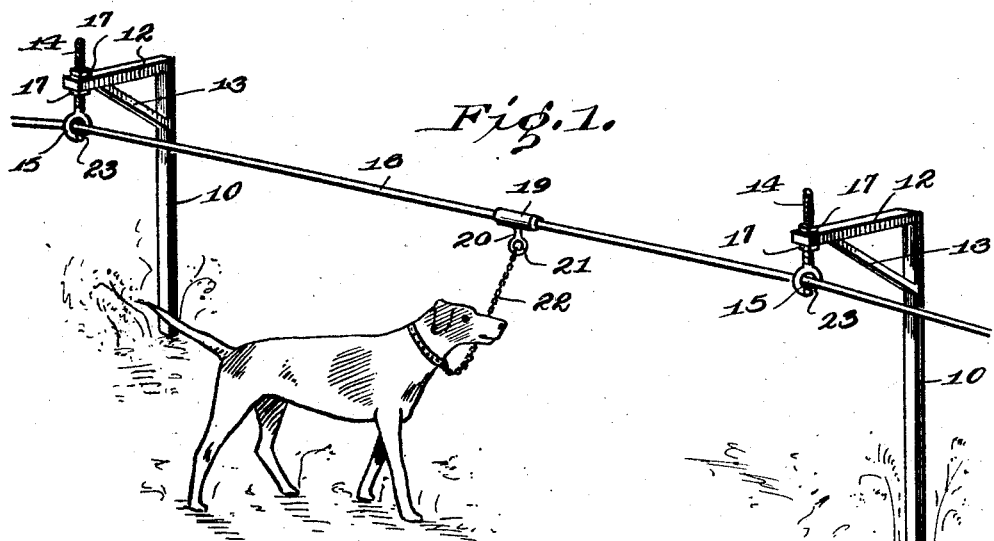
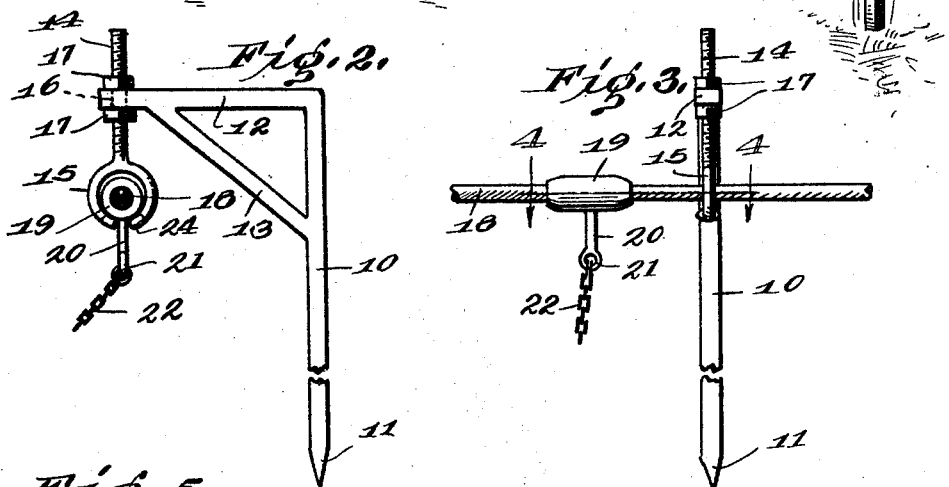
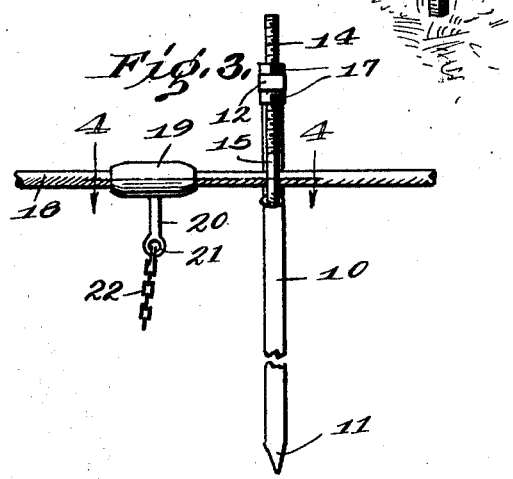
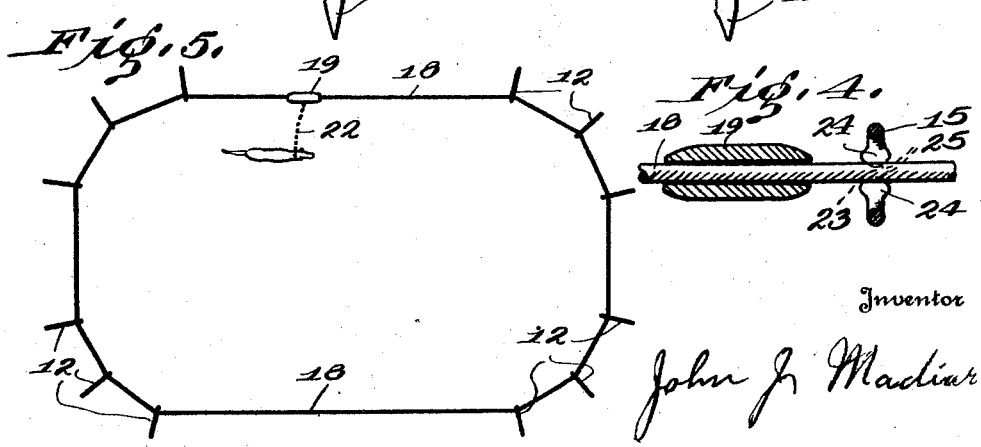
Inventor
John J. Madiar Patented Nov. 24, 1925.

1,563,212

UNITED STATES PATENT OFFICE.

JOHN J. MADIAR, OF WEST FRANKFORT, ILLINOIS.

ANIMAL-TETHERING DEVICE.

Application filed July 8, 1925. Serial No. 42,236.

*To all whom it may concern:*

Be it known that I, JOHN J. MADIAR, a citizen of the United States, residing at West Frankfort, in the county of Franklin and State of Illinois, have invented certain new and useful Improvements in an Animal-Tethering Device, of which the following is a specification.

The present invention relates to an animal tethering device and more especially to a device which will permit small domestic animals a certain range of freedom, and aims to provide a novel and improved device of this character which will securely hold the animal within certain limits.

Another object of the invention is the provision of means for holding a cable in a taut position for slidably receiving thereon a small cylindrical member to which the animal is attached by means of a chain, or the like.

It is also an object of the invention to provide an animal tethering device of the kind indicated, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein:

Figure 1 is a perspective view of a portion of my improved device,

Figure 2 is a side elevation of one of the members for holding the cable in proper position, Figure 3 is a front elevation of the same, Figure 4 is a section on line 4—4 of Figure 3, and Figure 5 is a diagrammatic view showing the manner in which my improved device is used.

In carrying out the invention, the numeral 10 designates a series of posts having their lower ends sharpened, as at 11, for permitting the same to be easily driven into the ground. On the upper ends of the posts 10 are provided right angularly extending portions 12, which are supported by braces 13 secured to said angled portions and to said posts. On the outer extremities of the extensions 12 are attached the shank portions 14 of eye members 15, said shank portions 14 being extended through openings 16 arranged in the extensions 12 and having screw threaded thereon a pair of nuts 17 which engage the opposite sides of the extensions 12 for permitting a certain amount of vertical adjustment of the eyes 15 and for holding said eyes and shank portions 14 rigidly to the extensions 12. Extending through each of the eyes 15 is a rope or cable 18 which is endless in order to form a continuous member.

Slidably mounted on the rope or cable 18 is a small sleeve 19 which is provided with a depending shank 20 which has provided on its lower end an eye 21 to which is attached a chain, or the like, 22 which in turn has its opposite end attached to the collar of an animal. The eyes 15 carried by the extensions 12 are provided at their lower portions with cut out slots 23 for permitting the shank 20 carried by the slidable cylindrical member 19 to move through the eyes 15 when the cylindrical member is slid upon the rope or cable 18. It will be noted that the shank portion 20 is smaller in size than the cable or rope 18 so as to pass through the cut out portions 23 in the eyes 15 while the cable or rope is retained in said eyes 15.

By referring to Figure 4 it will be noted that the eyes 15 are provided with enlarged portions 24 adjacent the cut out portions 23 and that said enlarged portions are provided with tapered faces 25 for directing the shank 20 carried by the cylindrical member to the cut out portions 23. By referring to Figure 5, it can be seen that the cable or rope 18 is continuous and that an animal attached to the cylindrical member 19 may continue to run in one direction without being stopped, thus permitting the animal to exercise itself. While I have shown the continuous cable 18 arranged in oval formation, it is to be understood that the posts 10 may be arranged at various relations to each other according to the shape of the area in which the animal is to be retained.

In operation, the animal is attached to the cylindrical member 19 and is permitted to run at will according to the arrangement of the cable 18, the cylindrical member 19 passing through the eyes 15 while the shank portion 20 carried by said cylindrical member passes through the cut out portions 23 in said eyes 15. By providing screw threads on the shank portions of the eyes, said eyes may be regulated or adjusted in a vertical direction with relation to the extensions 12 according to the size of the animal attached to the cable 19, thus providing a structure which may be used in connection with various size animals.

Having thus described my invention, what I claim as new is:

1. A device of the character described comprising a series of posts, an eye carried by each of said posts, said eyes having cut away portions, a cable suspended from said posts and received in said eyes, a member slidably mounted on said cable, and means for attaching an animal to said slidable member, said means for attaching said animal being of a size to pass through the cut away portions in said eyes.

2. A device of the character described comprising a series of posts, an eye carried by each post, an endless cable suspended by said eyes, said eyes having cutaway portions therein, a cylindrical member slidably mounted on said cable, a depending eye carried by said cylindrical member and being adapted to pass through the cutaway portions in said eyes, and means for attaching an animal to said depending eye.

3. A device of the character described comprising a series of posts, an angular extension formed on each of said posts, an eye carried by each of said angular extensions, said eyes having cut away portions formed at the lower portions thereof, a cable extending through the eyes and being of sufficient size to be retained therein, and means slidably mounted upon said cable for attaching an animal thereto, said means slidably mounted on said cable being of a size passing through the openings of said eyes and the cut away portions thereof.

4. A device of the character described comprising a series of posts, angular extensions formed on each of said posts, a series of eyes each having a threaded shank, means threaded on said shanks for engaging said angular extensions for permitting vertical adjustment of said eyes, a cable extending through each of said eyes, and means slidably mounted on said cable for attaching an animal thereto.

5. A device of the character described comprising a series of posts, angular extensions formed on the upper ends of said posts, a depending eye carried by each of said angular extensions, said eyes having cut away portions formed at the lower portions thereof, an endless cable extended through the eyes and being of sufficient size to be retained therein, a cylindrical member slidably mounted upon said cable, a depending shank carried by said cylindrical member and being adapted to pass through the cut away portions of said eyes while the cylindrical member passes through said eyes, and means for attaching an animal to said depending shank.

In testimony whereof, I have affixed my signature.

JOHN J. MADIAR.